(12) United States Patent
Wang et al.

(10) Patent No.: US 9,199,876 B2
(45) Date of Patent: Dec. 1, 2015

(54) THIN LITHIUM-ALUMINOSILICATE GLASS FOR THREE DIMENSIONAL PRECISION MOLDING

(75) Inventors: Chong Wang, Jiangsu (CN); José Zimmer, Losheim am See (DE); Feng He, Jiang Su (CN); Gerhard Lautenschlaeger, Jena (DE); Armin Vogl, Jena (DE)

(73) Assignee: SCHOTT GLASS TECHNOLOGIES (SUZHOU) CO., LTD., New District Suzhou (CN)

( * ) Notice: Subject to any disclaimer, the term of this patent is extended or adjusted under 35 U.S.C. 154(b) by 253 days.

(21) Appl. No.: 13/581,412

(22) PCT Filed: Feb. 22, 2011

(86) PCT No.: PCT/CN2011/071157
§ 371 (c)(1),
(2), (4) Date: Nov. 9, 2012

(87) PCT Pub. No.: WO2011/103799
PCT Pub. Date: Sep. 1, 2011

(65) Prior Publication Data
US 2013/0189486 A1   Jul. 25, 2013

(30) Foreign Application Priority Data
Feb. 26, 2010   (CN) .......................... 2010 1 0125892

(51) Int. Cl.
| | |
|---|---|
| C03C 21/00 | (2006.01) |
| C03C 3/095 | (2006.01) |
| C03C 3/087 | (2006.01) |
| C03B 23/03 | (2006.01) |
| C03B 23/035 | (2006.01) |
| C03C 3/097 | (2006.01) |
| C03C 19/00 | (2006.01) |

(52) U.S. Cl.
CPC ........... *C03C 21/002* (2013.01); *C03B 23/0302* (2013.01); *C03B 23/035* (2013.01); *C03C 3/095* (2013.01); *C03C 3/097* (2013.01); *C03C 19/00* (2013.01); *Y10T 428/24355* (2015.01); *Y10T 428/265* (2015.01)

(58) Field of Classification Search
CPC ........ C03C 3/083; C03C 3/085; C03C 3/087; C03C 3/091; C03C 3/093; C03C 3/095; C03C 21/00; C03C 21/002
USPC .............. 501/64, 66, 67, 68, 69, 70; 428/410, 428/426
See application file for complete search history.

(56) References Cited

U.S. PATENT DOCUMENTS

| | | | |
|---|---|---|---|
| 4,156,755 A | 5/1979 | Rinehart | |
| 4,726,981 A | 2/1988 | Pierson et al. | |
| 2009/0197088 A1 | 8/2009 | Murata | |
| 2010/0167091 A1* | 7/2010 | Tachiwana et al. ........... 428/828 |
| 2010/0255350 A1* | 10/2010 | Endo et al. ................. 428/846.9 |
| 2012/0321898 A1* | 12/2012 | Meinhardt et al. ............ 428/410 |

FOREIGN PATENT DOCUMENTS

| | | |
|---|---|---|
| JP | 11314931 | 11/1999 |
| JP | 2000272931 | 10/2000 |
| JP | 2002174810 | 6/2002 |
| WO | WO 2007142324 A1 * | 12/2007 |

OTHER PUBLICATIONS

Machine Translation JP 2002-174810 A, Jun. 21, 2002.*
International Search Report dated Jun. 2, 2011 corresponding to International Patent Application No. PCT/CN2011/071157.

* cited by examiner

*Primary Examiner* — Anthony J Green
*Assistant Examiner* — Elizabeth A Bolden
(74) *Attorney, Agent, or Firm* — Ohlandt, Greeley, Ruggiero & Perle, LLP

(57) ABSTRACT

A thin lithium-aluminosilicate glass is provided. The glass is suitable for three dimensional precision molding and suitable for toughening, wherein after toughening, the glass has a center tension smaller than 50 Mpa, a surface compressive stress of 600-1200 Mpa, and a bending strength of up to 500 MPa. The glass also has a transition point lower than 550° C.

48 Claims, No Drawings

THIN LITHIUM-ALUMINOSILICATE GLASS FOR THREE DIMENSIONAL PRECISION MOLDING

TECHNICAL FIELD

The present invention relates to aluminosilicate glass. Particularly, the present invention relates to an aluminosilicate glass having high strength, high scratch resistance and high fracture toughness with characters of low temperature 3D molding and rapid ion exchange. More particularly, the present invention relates to an aluminosilicate glass having high strength, high scratch resistance and high fracture toughness with characters of low temperature 3D molding and rapid ion exchange, used as a screen protective material for planar and non-planar electronic products. Even more particularly, the present invention relates to an aluminosilicate glass having high strength, high scratch resistance and high fracture toughness with characters of low temperature 3D molding and rapid ion exchange, used as a protective glass for planar and non-planar touch screens. In addition, the present invention also relates to a chemical toughening process of the aluminosilicate glass.

BACKGROUND

Some electronic devices need non-flat screens and 3D shaped screens, such as a bended plane and folded edge for the reasons of design and technique. For improving of the strength of the protective glass of electronic devices, the glass needs strengthening through ion-exchange, normally by exchanging alkali metal ions having a smaller ionic radius in the glass with alkali metal ions having a larger ionic radius. During ion-exchange, since the alkali metal ions having a larger radius are restricted at the places where the alkali metal ions having a smaller radius are present, a compressive stress is formed in the surface layer of the glass. Generally, the glass is immersed into a molten metal salt such as $KNO_3$ for ion-exchange, and the process is named chemical toughening. The temperature of chemical toughening must be higher than the melting point of $KNO_3$ of 328° C.

The protective glass of electronic devices or touch screens generally has a higher glass transition temperature ($T_g$). The soda-lime glass normally has a $T_g$ of about 530-560° C. The available glass in market suitable for chemical toughening generally has an amount of $Al_2O_3$ for formation of glass network facilitating ion-exchange and speeding up ion-exchange. However, the glass of this kind has a $T_g$ of generally up to about 600° C. $Al_2O_3$ is a refractory oxide having a melting point higher than that of $SiO_2$ and has a very high Al—O bond energy. The melting temperature of the glass will correspondingly increase when $Al_2O_3$ is present in the glass. The molar ratio of alumina to alkali metal ions in the glass is a key factor for determining properties of the glass. When the ratio is less than 1, it is more likely that alumina will enter into the glass network to replace non bridge oxygen, increasing the melting temperature and viscosity of the glass. $Al_2O_3$ also can make a contribution to increase the chemical stability of the glass.

The glass used for protecting touch devices is generally sodium-aluminosilicate glass having a high $T_g$ and a quicker ion-exchange rate. The glass can have extremely high fracture strength through a suitable ion-exchange process and a $T_g$ normally higher than about 580° C.

It is economical to use a sodium-aluminosilicate glass for production of a pure flat protective glass. However, when the 3-D shaped protective glass is required, an excessively high $T_g$ becomes a disadvantage. A glass having a high $T_g$ cannot be shaped through molding economically since the deformation temperature of the glass is higher than the $T_g$. A sodium-aluminosilicate glass has a deformation temperature normally higher than 600° C., which leads to decrease in lifetime of the mold and its coating significantly. It is expected in the art to have a glass having a $T_g$ lower than 550° C. but a very high strength after chemical toughening. A glass having a lower $T_g$ can be obtained by partially replacing sodium in the sodium-aluminosilicate glass with lithium. The strength of the glass can be greatly increased after chemical toughening, and a very high surface hardness can also be obtained at the same time. A silicate glass containing $Li_2O$ has a viscosity lower than a glass containing $Na_2O$, if the content of alkali metal is the same. Therefore, the lithium-aluminosilicate glass has a lower molding temperature, and then inexpensive mold and coating material can be used.

The $T_g$ of the lithium-aluminosilicate glass can be controlled to far lower than 550° C. through selection of components, therefore, the glass can be molded by a steel mold or aluminum mold with a nickel alloy coating. The other way around, an expensive mold of metal carbide or nitride, such as a tungsten carbide mold has to be used for a sodium-aluminosilicate glass having a high $T_g$.

On the other hand, the strength of lithium-aluminosilicate glass after a reasonable chemical toughening has the strength similar to that of the toughened sodium-aluminosilicate glass. The diffusion speed of lithium ions is faster than that of sodium ions; therefore, the period of toughening time for the lithium-aluminosilicate glass is shorter than that of the sodium-aluminosilicate glass. The lithium-aluminosilicate glass can be chemically toughened by sodium salts or potassium salts. Such flexibility of toughening confers more selections of toughening conditions and more potential on the lithium-aluminosilicate glass to meet the requirements of other properties and processes.

When the temperature is not distributed evenly in glass, the value of the thermal expansion of a glass is very important. A glass having a higher thermal expansion coefficient cannot be suitable for a quicker cooling speed, and a glass having a higher temperature after molding may generate cracks easily if exposing to surrounding atmosphere. Compared with a glass containing $Na_2O$, the glass containing $Li_2O$ has a lower thermal expansion coefficient, and therefore, is suitable for a quicker molding speed.

During molding production, the costs and lifetimes of the molding material and the coating are critical to the total costs. The material of a common mold is tungsten carbide, and a metal mold such as a steel mold or a nickel mold or a steel/nickel alloy mold can also be used when the molding temperature is lower. General coating materials are made of noble metals such as platinum or iridium, and a rear earth metal coating, a DCL coating or a sol-gel coating can also be used under particular conditions.

SUMMARY OF THE INVENTION

A glass is provided that can be chemically toughened, has a $T_g$ lower than 550° C. and can be easily 3D shaped. In one embodiment, the glass is a silicate glass or a phosphate glass, such as an aluminosilicate glass, including lithium-aluminosilicate glass, sodium-aluminosilicate glass, and lithium-sodium-aluminosilicate glass.

In the first place, the present invention provides a glass that can be molded into a 3D shaped glass at a temperature of 500-700° C., and has a $T_g$ lower than 550° C. In one embodiment, the glass has a $T_g$ lower than 530° C. In another embodiment, the glass has a $T_g$ lower than 520° C. In yet another embodiment, the glass has a $T_g$ lower than 510° C.

In one example, the molding temperature ranges from 500 to 650° C. In another example, the molding temperature ranges from 500 to 630° C. In yet another example, the molding temperature ranges from 500 to 600° C.

In one example, the glass is a flat glass having a thickness ranging from 0.4 to 2.0 mm.

Another purpose of the present invention is to provide a glass suitable for chemical toughening. In one example, the glass is an alkaline silicate or phosphate glass suitable for toughening. In another example, the glass is lithium-aluminosilicate glass.

In one example, the glass is subjected to toughening in molten $NaNO_3$, has a surface stress of at least 500-800 MPa, and a surface stress layer of 50 microns.

In one example, the glass is subjected to toughening in molten $KNO_3$, has a surface stress of at least 800-1200 MPa, and a surface stress layer of 10 microns.

In one example, the glass is subjected to toughening in a mixed salt of molten $NaNO_3$ and $KNO_3$, and has a surface stress of at least 600-1000 MPa and a surface stress layer of 50 microns.

In one example, the glass has a bending strength of up to 500 MPa, and in another example, the glass has a bending strength of up to 600 MPa.

DETAILED DESCRIPTION OF THE INVENTION

The soda-lime glass is subjected to chemical toughening via ion-exchange, generally in a salt bath, such as $KNO_3$, afterwards it can be used as a protective glass of a displaying device. Generally, such a glass has a surface stress of several hundreds of MPas, but the thickness of the surface stress layer for control of cracks extending is much limited. The disadvantages of the soda-lime glass are in that the amount of $Al_2O_3$ is low, and thus a rapid ion-exchange speed cannot be obtained. Even after a long time of ion-exchange treatment, the thickness of the surface stress layer is normally just around 10 microns.

The newly developed glasses, such as those disclosed in US 2008/0286548, CN 200810147442.3, CN 200910301240.4, etc. have better chemical toughening property and strength. However, these glasses cannot meet the requirements for low temperature 3D shaping, for example, the requirement for the protective glass of a touch screen, since these glasses have to be shaped under elevated temperatures, resulting in high production costs and low productivity.

Lowering the $T_g$ of an aluminosilicate glass to lower than 550° C. may increase the difficulties in glass melting as the tendency of glass crystallization is strengthened. It is imperative for oxides such as $ZrO_2$ to be added into the glass for reducing the tendency of crystallization. In addition, an aluminosilicate glass having a higher amount of alkali metal can erode the glass furnace significantly during melting, and therefore, suitable refractory materials have to be selected for the glass furnace.

Adding $ZrO_2$ and ZnO can improve the water resistance of glass.

The transmittance of a glass is utmost important for application in the protection of displaying devices. Impurity elements may affect the transmittance after chemical toughening. The reduction in transmittance is caused mainly by multivalent ions such as $Fe^{2+}$, $Fe^{3+}$. Therefore, the amount of impurity elements must be lower than 1,000 ppm, preferably lower than 500 ppm, more preferably lower than 100 ppm.

In one example, a glass that can be used for low temperature molding has the following compositions:

| | |
|---|---|
| $SiO_2$ | 58-65 wt. % |
| $Li_2O$ | 4.6-5.4 wt. % |
| $Na_2O$ | 8.1-9.7 wt. % |
| $K_2O$ | 0.01-1.0 wt. % |
| $Al_2O_3$ | 16-20 wt. % |
| $B_2O_3$ | 0.1-1.0 wt. % |
| MgO | 0-0.1 wt. % |
| SrO | 0-0.2 wt. % |
| ZnO | 0-0.5 wt. % |
| CaO | 0.2-2.0 wt. % |
| $ZrO_2$ | 2.5-5.0 wt. % |
| $P_2O_5$ | 0-1 wt. % |
| $Fe_2O_3$ | 0.008-0.2 wt. % |
| $SnO_2$ | 0.05-0.6 wt. % |
| $CeO_2$ | 0.01-0.3 wt. % | and at the same time:

$(Li_2O+Al_2O_3)/(Na_2O+K_2O)>2.0$, $SnO_2+CeO_2+Fe_2O_3>0.1$ wt. %, $0.8$ wt. % $<CaO+ZnO+P_2O_5+B_2O_3+CeO_2+Fe_2O_3<2.0$ wt. %.

$SiO_2$ is a glass former.

$Al_2O_3$ is an utmost important component for preparing a glass having high strength and high hardness. For the purpose of achieving a quicker diffusing speed to increase the $Na^+$—$K^+$ ion-exchange rate, the amount of $Al_2O_3$ in the glass must be high for the reasons that $Al^{3+}$ tends to form $[AlO_4]$ tetrahedron having a volume far greater than that of $[SiO_4]$ tetrahedron commonly seen in glass, and therefore, has more space as the channels for ion-exchange. However, it should be avoided that the amount of $Al_2O_3$ is greater than 20 wt %, or otherwise the devitrification tendency and viscosity of the glass will be increased accordingly. Therefore, the amount of $Al_2O_3$ ranges from 16 to 20 wt. %, preferably from 17 to 19 wt. %, more preferably from 17.5 to 18.5 wt. %.

Addition of $Li_2O$ into glass can reduce the melting point of the glass, and in turn the glass transition temperature is reduced, too. More importantly, ion-exchange can be carried out for lithium ions in a salt bath, particularly in the salt bath of $NaNO_3$, the exchange speed between $Li^+$—$Na^+$ is very fast, resulting in a very deep surface stress layer. $Li_2O$ is necessary for fast ion exchange and for a glass having a lower $T_g$ for molding. However, an excessive amount of $Li_2O$ may increase the tendency of devitrification, and erode the furnace body severely during production. In the present invention, the amount of $Li_2O$ is from 4.6 to 5.4 wt. %, preferably from 4.8 to 5.2 wt. %.

$Na_2O$ is helpful to reduce the melting temperature of glass. When the glass is subjected to chemical toughening in $NaNO_3$, a certain amount of $Na^+$ may speed up the ion-exchange between $Li^+$ and $Na^+$. A glass containing $Na_2O$ can also be exchanged with $K^+$ whereby obtaining a high surface stress, and thus a more efficient exchange effect. In principle, it is desired that the amount is as high as possible, whereas an excessive amount of $Na_2O$ may decrease the glass transition temperature significantly and increase the tendency of devitrification of the glass. In the present invention, the amount of $Na_2O$ is from 8.1 to 9.7 wt. %, preferably from 8.4 to 9.6 wt. %, and more preferably from 8.6 to 9.5 wt. %.

$K_2O$ can also make a contribution to reducing the melting temperature of a glass. However, an excessive amount of $K_2O$ will exert an adverse impact on the ion-exchange process. The amount of $K_2O$ is therefore, lower than 1.0 wt. %, preferably lower than 0.5 wt. %, and more preferably lower than 0.3 wt. %.

MgO can increase the homogeneity of a glass melt during melting. In the present invention, it is present only in the form of an impurity in an amount of lower than 0.1 wt. %.

SrO presents in a form of an impurity in an amount lower than 0.2 wt. %.

ZnO, CaO and $P_2O_5$ all have the effects on reducing the melting temperature of the glass but are present in a lower amount in the present invention. In the present invention, the amount of ZnO is lower than 0.5 wt. %, preferably lower than 0.4 wt. %, and more preferably lower than 0.3 wt. %. The amount of CaO is lower than 2.0 wt. %, preferably lower than 1.5 wt. %, and more preferably lower than 1.0 wt. %. And the amount of $P_2O_5$ is lower than 1.0 wt. %, preferably lower than 0.5 wt. %, and more preferably lower than 0.2 wt. %.

The amounts of $Li_2O$ and $Al_2O_3$ should be suffieiently high so as to achieve a faster ion-exchange speed, and should satisfy the condition of $(Li_2O+Al_2O_3)/(Na_2O+K_2O)>2.0$. $SnO_2$ is an indispensable component in the glass produced through float process, and $Fe_2O_3$ is an impurity in starting materials for melting a glass. A small amount of $CeO_2$ helps improve the solarization resistance and the color appearance of glass. The amount of the three oxides is greater than 0.1 wt. %. CaO, ZnO, $P_2O_5$, and $B_2O_3$ are impurities in starting materials for melting a glass and their amounts should be lower than a certain level to ensure that the stable quality of the glass. However, a steep demand on the purity of the starting material will incur a significant increase in production cost. In the present invention, 0.8 wt. %<$CaO+ZnO+P_2O_5+B_2O_3+CeO_2+Fe_2O_3$<2.0 wt. %.

Adding $ZrO_2$ to a glass may increase the chemical stability and hardness of the glass. However, an amount of $ZrO_2$ higher than 5.0 wt % may cause a severe devitrification tendency. Therefore, the present invention has an amount of $ZrO_2$ lower than 5.0 wt %, preferably lower than 4.5 wt %, more preferably lower than 4.0 wt %.

ZnO and $ZrO_2$ can be used to improve the chemical stability and reduce volatilization of volatile elements in the glass, such as Li.

$B_2O_3$ is also a glass former. Adding $B_2O_3$ to a glass can also reduce the viscosity of the glass. However, an excessive amount of $B_2O_3$ may render the glass transition temperature too low, which is disadvantageous to melt a glass having a high amount of $Al_2O_3$. At the same time, an excessive amount of $B_2O_3$ may reduce ion-exchange speed. In the glass in the present invention, the amount of $B_2O_3$ is lower than 1.0 wt. %, preferably lower than 0.8 wt. %, more preferably lower than 0.6 wt. %.

Adding of $CeO_2$ may increase the solarization resistance and color appearance of a glass. A small amount of $CeO_2$ is enough to achieve such an effect, and the amount can be from 0.01 to 0.3 wt. %, preferably from 0.03 to 0.25 wt. %, more preferably from 0.05 to 0.2 wt. %.

$SnO_2$ is an indispensable component in a glass by float production. In the glass in the present invention, the amount is lower than 0.6 wt. %, preferably lower than 0.5 wt. %, and more preferably lower than 0.4 wt. %. An excessive amount of $SnO_2$ may decrease the transmittance of a glass.

In one example, for use as a protective glass of a touch screen, the glass is a thin glass having a thickness from 0.4 to 2 mm.

A thin glass can be produced through a process such as down-drawn, over flow fusion, float, up-drawn, etc. The processes of down-drawn and over flow fusion are commonly used for production of the glass for displaying. When producing a glass having a high amount of $Al_2O_3$, the process of removing bubbles from the glass is a challenge. Therefore, $As_2O_3$ and $Sb_2O_3$ are often introduced during melting to help refine and homogenize the glass melt. "Green" has become an important trend in the field of consumer electronics nowadays. $As_2O_3$ and $Sb_2O_3$ are regarded as "non-green" components, and the addition thereof into a glass should be prohibited for controlling their amounts.

In one example in the present invention, the glass is produced through float production. Since $SnO_2$ is formed in the tin bath used in a float process, it is completely unnecessary to add a harmful refiner such as $As_2O_3$ and $Sb_2O_3$ during the process of glass melting. Therefore, the produced glass is a "green" glass free of harmful components.

In one example, for being used as a protective glass of a touch control, the glass is designed as having a bent surface or folded edge. These shapes can only be obtained through precision molding. The precision molding has been widely used for producing aspheric lenses by using a low $T_g$ optical glass. The glass has a shape of folded edge, and the shape also includes but is not limited to a sheer plane, a curved surface with a plane in the central area, and particularly designed shapes in other portions.

The temperature for precision molding is generally from 500 to 700° C. Therefore, a glass having a $T_g$ lower than 550° C. is suitable for precision molding. The steps of molding comprise placing a raw glass sheet in a base mold, vacuuming the mold chamber and filling in nitrogen or other inert gases, heating the base mold and the raw glass sheet, applying pressure with a press mold, molding, cooling, and taking out the pressed glass.

The $T_g$ of a glass material is the key factor affecting the molding temperature. For achieving the purpose of low temperature molding, $T_g$ should be lower than 550° C., preferably lower than 530° C., more preferably lower than 520° C., and most preferably lower than 510° C. According to different $T_g$ of various glasses, the molding temperature is generally from 500 to 700° C., preferably from 500 to 650° C., more preferably from 500 to 630° C., and most preferably from 500 to 600° C.

For being used as a protective glass of a touch screen, the bent glass needs chemical toughening. The chemical toughening can strengthen the glass and render the glass better scratch resistance and impact resistance to avoid crack. The chemical toughening is a process of exchanging smaller alkali metal ions in glass with larger alkali metal ions in a salt bath. For example, $Na^+$ and $Li^+$ ions in glass can be exchanged with $K^+$ ions in $KNO_3$ salt bath. After ion-exchange, the compressive stress is formed in the surface layer of a glass whereby increasing the strength of glass. For balancing the compressive stress in the surface layer of a glass, the tensile stress is formed in the center of the glass. An excessive tensile stress may increase the risk of glass breakage. A bent glass part is more sensitive to the tensile stress at the center under an external force. Therefore, the tensile stress at the center must be lower than 50 MPa, and preferably designed to be lower than 30 MPa, more preferably lower than 20 MPa, and most preferably lower than 15 MPa. The surface compressive stress must be greater than 600 MPa, and preferably designed to be greater than 700 MPa, and most preferably greater than 800 MPa, and generally not greater than 1,200 MPa.

The thickness of the surface stress layer reflects the tolerance of a toughened glass against scratching. The deeper the surface stress layer, the more the tolerance of the glass against scratch. However, it is not correct to increase the thickness of the surface stress layer as much as possible, as the tensile stress at the center will increase as well. In one example, when the glass has a thickness of 0.7 mm, the surface stress layer has a thickness of less than 60 μm, and preferable designed to be less than 50 μm, and more preferable designed to be less than 40 μm.

Soda-lime glass and sodium-aluminosilicate glass do not possess the properties of both being suitable for precision molding and the qualities of the glass surface not decreasing significantly, which, however, are often required. The adhesion and thermal shock properties of a glass must be able to satisfy the requirements of a rapid molding process, especially when pressing a glass sheet thinner than 3 mm, preferably thinner than 2 mm, more preferably thinner than 1 mm. In one example, even a glass having a thickness smaller than 0.7 mm and 0.5 mm can also be pressed.

A specific structure of the glass surface can also be generated or maintained during the pressing process. The surface structure can have a decorative effect and optical function (refraction, diffraction, reflection), such as lenses, light guide, etc. Mechanical and touching functions can also be included in the surface structure. Cavities can be pressed directly on a thin glass.

The following examples are used for illustrating the properties of the present invention, but the present invention is not limited thereto.

Examples

The glass has the followong principal components: $SiO_2$ 62.21%, $Al_2O_3$ 17.99%, $Na_2O$ 9.54%, $Li_2O$ 5.08%, $ZrO_2$ 3.61%, and the balancing are $B_2O_3$, $P_2O_5$, $K_2O$, CaO, SrO, ZnO, $CeO_2$, $Fe_2O_3$ and $SnO_2$.

First, corresponding starting materials according to the components given in examples in table 1 are formulated, the starting materials are melt at a temperature of 1600-1640° C. in a platinum crucible, maintaining the temperature for 5-15 hours, then refined at a temperature of 1640-1660° C., and cooled to about 1600° C. The platinum crucible is taken out from a high temperature furnace, and the glass melt is poured into a cold stainless steel mold, and a glass blank sized about 100×80×40 mm is obtained. Afterwards, the glass is put into an annealing furnace at a temperature of about 600° C. together with the stainless steel mold, annealing for about 2-8 hours.

The annealed glass is subjected to cutting, edging, and fine polishing to the desired size, i.e., 80×60×0.7 mm. After polishing, the surface roughness is less than 1 nanometer.

The thermal expansion coefficient and transition point are measured on an dilatometer in accordance with the following methods. The sample is processed into a cylinder of 5 mm diameter. Changes in length between 20° C. and 300° C. are recorded and thus the linear expansion coefficient is calculated. An obvious sudden change in the linear expansion coefficient takes place around the transition point of the glass, and the transition point of the glass can be obtained through extrapolation.

The glass has a $T_g$ of 505° C. and a linear expansion coefficient of $8.5 \times 10^{-6}$/° C. upon measurement.

Archimedes' principle is used to measure the density of the glass. The glass sample is immersed into a container containing water, and the displacement change in the container is measured precisely, thereby obtaining the volume of the sample. The weight of the sample, which can be measured precisely, is divided by the volume whereby the data of density of the glass is obtained.

The density of the glass is 2.49 g/cm$^3$.

The glass is subjected to a molding test. A predetermined shape can be made via bending and shaping at about 575° C.

The sample is subjected to chemical toughening. The toughening is conducted in a small salt bath furnace of laboratory scale (diameter of 250×250 mm, and depth of 400 mm). The sample is placed on a special erosion resistant stainless steel sample support. After ion-exchange treatment in $KNO_3$ salt bath at 400° C. for 6 hours, the glass has a surface compresive stress of 810 Mpa, a center tensile stress of 31 Mpa, and a compressive stress layer depth of 25 μm upon measurement.

The stress of the glass and the depth of the stress layer of the glass are measured by FSM6000 and polarizing microscope.

The breakage strength of the sample is measured on a four-point bending strength testing machine. A sample after being subjected to chemical toughening can have a breakage strength of up to 600 MPa.

Comparative Examples

The sample has components of Comparative Examples in Table 2, free of $Li_2O$, but has a higher amount of $Na_2O$. Even having a good effect of chemical strengthening, the sample is not suitable for 3D molding at a lower temperature because of a higher $T_g$.

TABLE 1

| | Examples | | | | | |
|---|---|---|---|---|---|---|
| | 1 | 2 | 3 | 4 | 5 | 6 |
| $SiO_2$ (wt. %) | 62.21 | 62.21 | 62.26 | 61.81 | 63.23 | 61.19 |
| $Al_2O_3$ (wt. %) | 18.02 | 17.99 | 17.88 | 18.23 | 17.85 | 18.62 |
| $B_2O_3$ (wt. %) | 0.16 | 0.2 | 0.41 | 0.3 | 0.2 | 0.1 |
| $P_2O_5$ (wt. %) | 0.02 | 0.07 | 0.34 | 0.2 | 0.1 | 0.1 |
| $Li_2O$ (wt. %) | 5.18 | 5.08 | 4.87 | 5.13 | 4.95 | 5.24 |
| $Na_2O$ (wt. %) | 9.65 | 9.54 | 8.82 | 8.99 | 8.45 | 9.31 |
| $K_2O$ (wt. %) | 0.08 | 0.08 | 0.1 | 0.1 | 0.08 | 0.1 |
| MgO (wt. %) | | | 0.03 | 0.05 | 0.03 | |
| CaO (wt. %) | 0.60 | 0.75 | 0.81 | 0.89 | 0.79 | 0.8 |
| SrO (wt. %) | 0.07 | 0.08 | 0.18 | 0.09 | 0.06 | 0.1 |
| ZnO (wt. %) | 0.07 | 0.08 | 0.15 | 0.11 | 0.1 | 0.12 |
| $CeO_2$ (wt. %) | 0.11 | 0.11 | 0.16 | 0.13 | 0.15 | 0.18 |
| $ZrO_2$ (wt. %) | 3.63 | 3.61 | 3.81 | 3.79 | 3.83 | 3.96 |
| $Fe_2O_3$ (wt. %) | 0.1 | 0.1 | 0.08 | 0.08 | 0.08 | 0.08 |
| $SnO_2$ (wt. %) | 0.1 | 0.1 | 0.1 | 0.1 | 0.1 | 0.1 |
| ($Li_2O$ + $Al_2O_3$)/($Na_2O$ + $K_2O$) | 2.38 | 2.4 | 2.55 | 2.54 | 2.67 | 2.54 |

TABLE 1-continued

| | Examples | | | | | |
|---|---|---|---|---|---|---|
| | 1 | 2 | 3 | 4 | 5 | 6 |
| $SnO_2 + CeO_2 + Fe_2O_3$ | 0.31 | 0.31 | 0.34 | 0.31 | 0.33 | 0.36 |
| $CaO + ZnO + P_2O_5 + B_2O_3 + CeO_2 + Fe_2O_3$ | 1.06 | 1.31 | 1.95 | 1.63 | 1.42 | 1.38 |
| Thickness (mm) | 0.5 | 0.7 | 1.1 | 0.7 | 1.5 | 0.5 |
| Density (g/cm³) | 2.48 | 2.49 | 2.49 | 2.49 | 2.48 | 2.49 |
| $T_g$ (° C.) | 503 | 505 | 520 | 508 | 513 | 505 |
| CTE ($10^{-6}$/° C.) | 8.5 | 8.5 | 7.9 | 8.4 | 7.9 | 8.5 |
| molten salt for ion-exchange | $KNO_3$ | $KNO_3$ | $NaNO_3$ | $KNO_3$ | $NaNO_3$ | $KNO_3$ |
| ion-exchange temperature (° C.) | 385 | 400 | 410 | 400 | 400 | 390 |
| ion-exchange time (hours) | 1 | 6 | 1 | 4 | 1 | 2 |
| ion-exchange depth (μm) | 8 | 25 | 45 | 15 | 50 | 10 |
| surface compressive stress (Mpa) | 750 | 810 | 610 | 760 | 560 | 800 |
| center tensile stress (MPa) | 12 | 31 | 27 | 17 | 20 | 11 |

TABLE 2

| | Comparative Examples | |
|---|---|---|
| | 1 | 2 |
| $SiO_2$ (wt. %) | 70 | 62.6 |
| $Al_2O_3$ (wt. %) | 2 | 16.55 |
| $B_2O_3$ (wt. %) | | |
| $P_2O_5$ (wt. %) | | |
| $Li_2O$ (wt. %) | | |
| $Na_2O$ (wt. %) | 13 | 12.9 |
| $K_2O$ (wt. %) | 1 | 3.5 |
| MgO (wt. %) | 4 | 3.3 |
| CaO (wt. %) | 10 | 0.3 |
| ZnO (wt. %) | | |
| $CeO_2$ (wt. %) | | |
| $TiO_2$ (wt. %) | | 0.8 |
| $ZrO_2$ (wt. %) | | |
| $Fe_2O_3$ (wt. %) | | |
| $SnO_2$ (wt. %) | | 0.05 |
| thickness (mm) | 1.0 | 0.5 |
| Density (g/cm³) | 2.50 | 2.43 |
| $T_g$ (° C.) | 560 | 623 |
| CTE ($10^{-6}$/° C.) | 8.9 | 8.33 |
| ion-exchange temperature (° C.) | 420 | 460 |
| ion-exchange time (hours) | 8 | 8 |
| ion-exchange depth (μm) | 10 | 30 |
| surface compressive stress (Mpa) | 450 | 800 |
| center tensile stress (MPa) | 5 | 55 |

The invention claimed is:

1. A thin lithium-aluminosilicate glass for three dimensional precision molding, comprising:
    after toughening, a center tensile stress smaller than 50 MPa, a surface compressive stress of 500-1200 MPa, a bending strength of at least 500 MPa, and a glass transition point lower than 550° C.; and
    a glass composition, based on the total weight, in weight percentage:

| | |
|---|---|
| $SiO_2$ | 58-65 wt. % |
| $Li_2O$ | 4.6-5.4 wt. % |
| $Na_2O$ | 8.1-9.7 wt. % |
| $K_2O$ | 0.01-1.0 wt. % |
| $Al_2O_3$ | 16-20 wt. % |
| $B_2O_3$ | 0.1-1.0 wt. % |
| MgO | 0-0.1 wt. % |
| SrO | 0-0.2 wt % |
| ZnO | 0-0.5 wt. % |
| $ZrO_2$ | 2.5-5.0 wt. % |
| $P_2O_5$ | 0-1 wt. % |
| $Fe_2O_3$ | 0.008-0.2 wt. % |
| $SnO_2$ | 0.05-0.6 wt. % |
| $CeO_2$ | 0.01-0.3 wt. % | wherein:
    $(Li_2O+Al_2O_3)/(Na_2O+K_2O)$ is greater than 2.0,
    $SnO_2+CeO_2+Fe_2O_3$ is greater than 0.1 wt. %, and
    $CaO+ZnO+P_2O_5+B_2O_3+CeO_2+Fe_2O_3$ is greater than 0.8 wt. % and less than 2.0 wt. %.

2. The thin lithium-aluminosilicate glass according to claim 1, wherein the center tensile stress is smaller than 30 MPa.

3. The thin lithium-aluminosilicate glass according to claim 2, wherein the center tensile stress is smaller than 20 MPa.

4. The thin lithium-aluminosilicate glass according to claim 1, wherein the surface compressive stress is 700-1200 MPa.

5. The thin lithium-aluminosilicate glass according to claim 4, wherein the surface compressive stress is 800-1200 MPa.

6. The thin lithium-aluminosilicate glass according to claim 1, wherein the bending strength is at least 600 MPa.

7. The thin lithium-aluminosilicate glass according to claim 1, wherein the glass transition point is lower than 530° C.

8. The thin lithium-aluminosilicate glass according to claim 7, wherein the glass transition point is lower than 520° C.

9. The thin lithium-aluminosilicate glass according to claim 8, wherein the glass transition point is lower than 510° C.

10. The thin lithium-aluminosilicate glass according to claim 1, wherein $K_2O$ is less than 0.5 wt. %.

11. The thin lithium-aluminosilicate glass to claim 10, wherein $K_2O$ is less than 0.3 wt. %.

12. The thin lithium-aluminosilicate glass according to claim 1, wherein ZnO is less than 0.4 wt. %.

13. The thin lithium-aluminosilicate glass according to claim 12, wherein ZnO is less than 0.3 wt. %.

14. The thin lithium-aluminosilicate glass according to claim 1, wherein CaO is less than 1.5 wt. %.

15. The thin lithium-aluminosilicate glass according to claim 14, wherein CaO is less than 1.0 wt. %.

16. The thin lithium-aluminosilicate glass according to claim 1, wherein $P_2O_5$ is less than 0.5 wt. %.

17. The thin lithium-aluminosilicate glass according to claim 16, wherein $P_2O_5$ is less than 0.2 wt. %.

18. The thin lithium-aluminosilicate glass according to claim 1, wherein $B_2O_3$ is less than 0.8 wt. %.

19. The thin lithium-aluminosilicate glass according to claim 18, wherein $B_2O_3$ is less than 0.6 wt. %.

20. The thin lithium-aluminosilicate glass according to claim 1, wherein $ZrO_2$ is less than 4.5 wt. %.

21. The thin lithium-aluminosilicate glass according to claim 20, wherein $ZrO_2$ is less than 4.0 wt. %.

22. The thin lithium-aluminosilicate glass according to claim 1, wherein $SnO_2$ is less than 0.5 wt. %.

23. The thin lithium-aluminosilicate glass according to claim 22, wherein $SnO_2$ is less than 0.4 wt. %.

24. The thin lithium-aluminosilicate glass according to claim 1, wherein $Al_2O_3$ is from 17 to 19 wt. %.

25. The thin lithium-aluminosilicate glass according to claim 24, wherein $Al_2O_3$ is from 17.5 to 18.5 wt. %.

26. The thin lithium-aluminosilicate glass according to claim 1, wherein $Li_2O$ is from 4.8 to 5.2 wt. %.

27. The thin lithium-aluminosilicate glass according to claim 1, wherein $Na_2O$ is from 8.4 to 9.6 wt. %.

28. The thin lithium-aluminosilicate glass according to claim 27, wherein $Na_2O$ is from 8.6 to 9.5 wt. %.

29. The thin lithium-aluminosilicate glass according to claim 1, wherein $CeO_2$ is from 0.03 to 0.25 wt. %.

30. The thin lithium-aluminosilicate glass according to claim 29, wherein $CeO_2$ is from 0.05 to 0.2 wt. %.

31. The thin lithium-aluminosilicate glass according to claim 1, wherein the glass is free of $As_2O_3$ and $Sb_2O_3$.

32. The thin lithium-aluminosilicate glass according to claim 1, wherein the glass is molded into a 3D shape at a temperature between 500° C. and 700° C.

33. The thin lithium-aluminosilicate glass according to claim 7, wherein the glass is molded into a 3D shape at a temperature between 500° C. and 650° C.

34. The thin lithium-aluminosilicate glass according to claim 8, wherein the glass is molded into a 3D shape at a temperature between 500° C. and 630° C.

35. The thin lithium-aluminosilicate glass according to claim 9, wherein the glass is molded into a 3D shape at a temperature between 500° C. and 600° C.

36. The thin lithium-aluminosilicate glass according to claim 1, wherein the glass is a flat glass having a thickness between 0.4 mm and 2.0 mm.

37. The thin lithium-aluminosilicate glass according to claim 1, wherein the glass is subjected to toughening in a molten composition selected from the group consisting of $KNO_3$, $NaNO_3$, and a mixed salt of molten $NaNO_3$ and $KNO_3$.

38. The thin lithium-aluminosilicate glass according to claim 1, wherein the glass is subjected to toughening in molten $KNO_3$, and has a surface stress of 800-1200 MPa.

39. The thin lithium-aluminosilicate glass for according to claim 1, wherein the glass is subjected to toughening in molten $KNO_3$, and has a surface stress layer of at least 10 microns.

40. The thin lithium-aluminosilicate glass according to claim 1, wherein the glass is subjected to toughening in molten $NaNO_3$, and has a surface stress of 500-800 MPa.

41. The thin lithium-aluminosilicate glass according to claim 1, wherein the glass is subjected to toughening in molten $NaNO_3$, and has a surface stress layer of at least 50 microns.

42. The thin lithium-aluminosilicate glass according to claim 1, wherein the glass is subjected to toughening in molten $KNO_3$+NaNO, and has a surface stress of 600-1000 MPa.

43. The thin lithium-aluminosilicate glass according to claim 1, wherein the glass is subjected to toughening in molten $KNO_3$+$NaNO_3$, and has a surface stress layer of at least 50 microns.

44. The thin lithium-aluminosilicate glass according to claim 1, wherein the glass has a thickness ranging from 0.4 to 3.0 mm.

45. The thin lithium-aluminosilicate glass according to claim 1, wherein the glass has a thickness ranging from 0.4 to 2.0 mm.

46. The thin lithium-aluminosilicate glass according to claim 1, wherein the glass has a thickness ranging from 0.4 to 1.0 mm.

47. The thin lithium-aluminosilicate glass claim 1, wherein the glass is suitable for use as a protective glass of a touchpad.

48. The thin lithium-aluminosilicate glass according to claim 1, wherein the glass has a surface structure.

* * * * *